United States Patent [19]

Jeffries

[11] Patent Number: 5,026,334
[45] Date of Patent: Jun. 25, 1991

[54] SINGLE PISTON ACTIVATION OF A PLANETARY TRANSMISSION

[75] Inventor: Dennis L. Jeffries, Waterloo, Iowa

[73] Assignee: Deere & Company, Moline, Ill.

[21] Appl. No.: 331,914

[22] Filed: Apr. 3, 1989

[51] Int. Cl.$^5$ ............................................. F16H 57/10
[52] U.S. Cl. .................................. 475/142; 192/18 A
[58] Field of Search ............... 74/782, 783; 192/18 A, 192/12 C

[56] References Cited

U.S. PATENT DOCUMENTS

| | | | |
|---|---|---|---|
| 2,505,600 | 4/1950 | Wissman | 192/18 A |
| 2,636,581 | 4/1953 | Bitler | 192/18 A |
| 3,069,929 | 12/1962 | Hansen | 192/18 AX |
| 3,182,528 | 5/1965 | Lamburn | 192/18 AX |
| 3,283,862 | 11/1966 | Warnock | 192/18 A |
| 4,528,872 | 7/1985 | Umemoto et al. | 74/782 X |
| 4,610,181 | 9/1986 | Houley et al. | 192/18 AX |
| 4,706,520 | 11/1987 | Sivalingam | 192/18 A X |
| 4,798,103 | 1/1989 | Eastman | 74/782 X |

FOREIGN PATENT DOCUMENTS

| | | | |
|---|---|---|---|
| 1071897 | 2/1980 | Canada | 74/782 |
| 55-63043 | 5/1980 | Japan | 74/783 |

*Primary Examiner*—Dwight G. Diehl

[57] ABSTRACT

A single piston is used to activate the brake or clutch of a planetary transmission. The piston is spring-biased to engage one component and disengage the other, and hydraulically activated to disengage the first component and engage the second. An annular plate preferably is provided extending between the brake and the clutch, with the brake on one side of the plate and the clutch on the other. A spring then biases the annular plate towards one of the control components and away from the other, while a hydraulic cylinder is provided to press the plate away from the first component and towards the second.

12 Claims, 1 Drawing Sheet

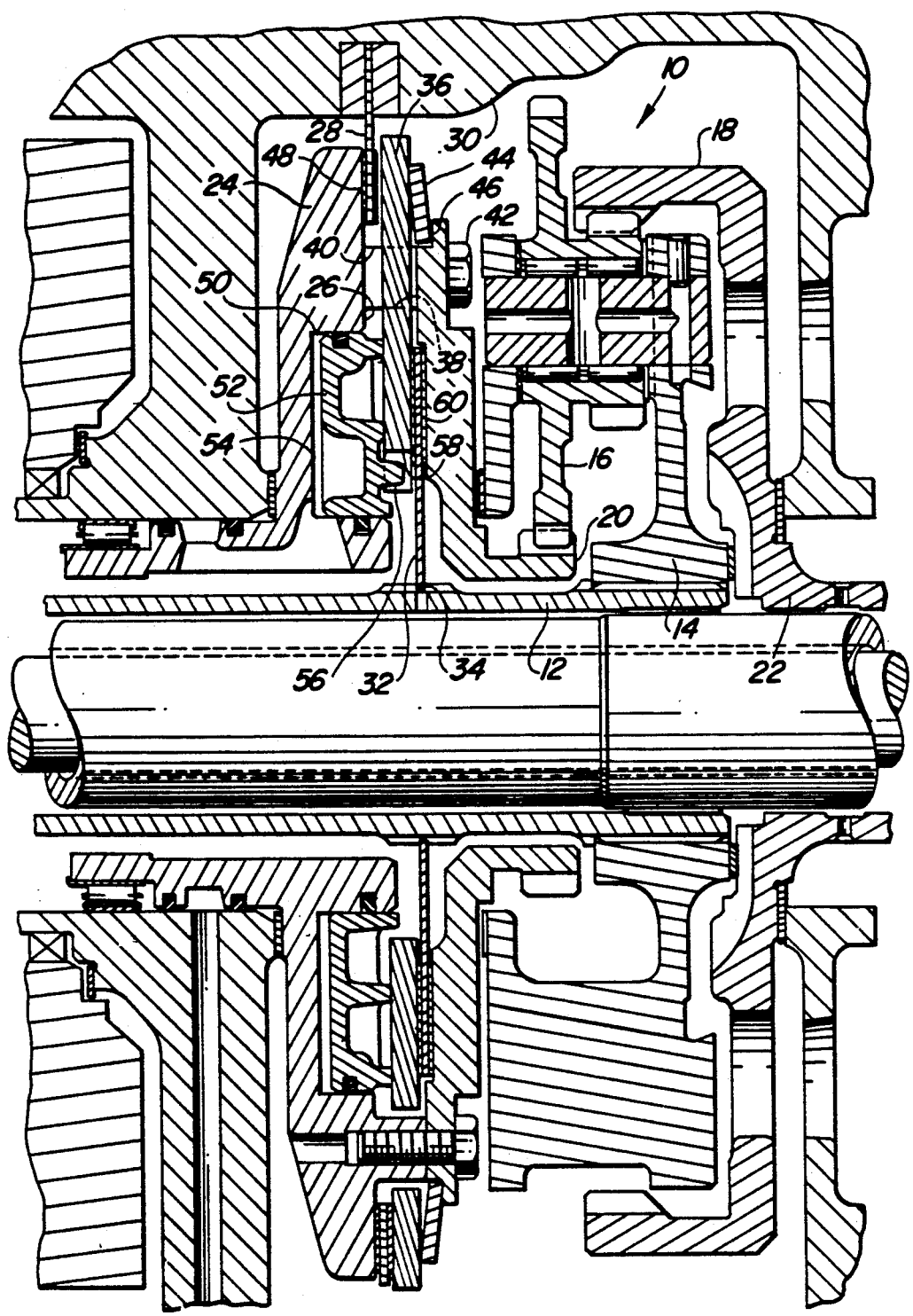

SINGLE PISTON ACTIVATION OF A PLANETARY TRANSMISSION

TECHNICAL FIELD

The present invention relates to transmissions, and particularly to the mechanisms for activating the brake and/or clutch used to control a planetary transmission.

BACKGROUND OF THE INVENTION

A typical planetary transmission has a sun gear, a ring gear and a planetary carrier with a plurality of planetary gears rotatably mounted thereon, with the planetary gears engaging the ring gear and the sun gear. It is known in the art to connect to input and output of the planetary to varying combinations of the sun gear, the planetary carrier, or the ring gear, depending upon the precise transmission characteristics desired. The typical planetary is shifted between different gear ratios by using a clutch to connect pairs of the sun gear, planetary carrier, or ring gear against relative rotation, and/or by using a brake to fix one of the sun gear, planetary carrier or ring gear against rotation relative to the transmission housing.

When both a clutch and a brake are used, the most common control mechanism is a spring-biased hydraulic piston to control the brake and a separate spring-biased hydraulic piston to control the clutch. Depending upon the exact characteristics desired, the springs for the pistons can either bias the corresponding components into engagement or out of engagement, with hydraulic fluid then applied to the piston to disengage or engage the component, as desired.

In many situations, the brake and clutch should never be engaged simultaneously. This means that the timing of application of hydraulic fluid to the pistons for the two control mechanisms must be carefully controlled. This poses the problem that the control valve structure for these fluids must be very carefully designed and manufactured to ensure that this timing is correct.

SUMMARY OF THE INVENTION

It therefore is an object of the present invention to provide a mechanism which can activate only one or the other of the brake and clutch of a planetary transmission at a time, without requiring careful design and manufacture of the control valves for the structure.

This object is accomplished according to the present invention by using a single piston to control both the clutch and brake. The piston is spring-biased to engage one of the components and disengage the second component, and hydraulically activated to disengage the first component and engage the second component. Which component is spring-engaged and which is hydraulically-engaged will depend upon the exact shifting characteristics desired in the particular application.

A convenient structure for this type of piston uses an annular plate positioned adjacent the planetary, with one of the shift components, e.g., the brake, located at a radially outward portion of the first side of the annular plate, and the other component, e.g., the clutch, located at a radially inward portion of the second side of the annular plate. A spring, e.g., a Belleville spring, can be positioned at a radially outward location on the second side of the plate, and a hydraulically activated piston can be positioned at the radially inward side of the first side of the plate, so that the actions of the spring and piston oppose each other.

BRIEF DESCRIPTION OF THE DRAWING

The single drawing illustrates a typical structure for a planetary gear having a single piston actuation according to the present invention.

DETAILED DESCRIPTION OF THE PREFERRED EMBODIMENT

The figure illustrates a preferred embodiment of the present invention. In this particular embodiment, the planetary transmission 10 is driven via input shaft 12, which is connected to the planetary carrier 14. The planetary carrier 14 has a plurality of planetary gears 16, illustrated here as double gears, rotatably mounted thereto. The planetary gears 16 engage the ring gear 18 and sun gear 20 in the usual manner. Power is drawn from the planetary transmission 10 by output shaft 22, which is connected to the ring gear 18.

The sun gear 20 has a sun gear extension 24 which is provided with an annular slot 26. A brake pad 28 fixed to the transmission housing 30 extends into the annular slot 26 at the radially outward portion thereof. Similarly, a clutch plate 32 extends into the radially inward portion of the annular slot 26 and is fixed by splines 34 for rotation with the input shaft 12. An annular plate 36 is positioned in the annular slot 26 between the brake pad 28 and clutch plate 32. Annular plate 36 has at least one opening 38 formed therein through which a portion 40 of the sun gear extension 24 extends to prevent significant relative rotation of the annular plate 36 relative to the sun gear extension 24. The sun gear extension 24 is formed conveniently in two pieces, which then may be assembled around the annular plate 36 and held together, e.g., by bolt 42.

A spring 44, e.g., an annular Belleville washer, is pressed between the annular plate 36 and a shoulder 46 formed in the sun gear extension 24 to bias the plate 36 towards the brake pad 28. This in turn presses the brake pad 28 against a brake engagement surface 48 of the sun gear extension 24 to prevent rotation of the sun gear 20 relative to the transmission housing 30.

A piston cavity 50 is formed in the sun gear extension 24 on the side of the annular slot 26 opposite from the spring 44, and has an annular piston 52 slidably disposed therein. A hydraulic chamber 54 is defined between the piston cavity 50 and piston 52. The hydraulic chamber 54 can be provided with pressurized hydraulic fluid or drained of fluid in the usual fashion (which is well known to one skilled in the art and therefore will not be described further herein) to press the piston 52 towards the annular plate 36, or to allow the piston 52 to be moved further into the piston cavity 50 by the spring 44. The piston 52 preferably is provided with at least one nose 56 which projects into a corresponding opening 58 in the annular plate 36 to prevent significant relative rotation therebetween.

Activation of the piston 52 by provision of pressurized hydraulic fluid to the hydraulic chamber 54 will cause the piston 52 to move the annular plate 36 away from the brake pad 28 and towards the clutch plate 32. This simultaneously will release the engagement of the brake pad 28 with the brake engagement surface 48 and cause the clutch plate 32 to engage the clutch engagement surface 60 of the sun gear extension 24, causing the sun gear 20 to rotate with the planetary carrier The other elements of the planetary shown in the figure, e.g., bearings, lubrication systems and the like, are well known to those of ordinary skill in the art, and therefore will not be described further herein.

Various modifications will readily be apparent to one of ordinary skill in the art. For example, while the structure illustrated in the figure provides input to the planetary carrier, draws output from the ring gear and uses a brake and clutch to control rotation of the sun gear relative to the transmission housing and planetary carrier, numerous other connections could be made by one of ordinary skill in the art without deviating from the scope of the present invention. Similarly, while the invention has been shown spring-biased to engage the brake and hydraulically activated to engage the clutch, these features could be reversed as desired for a particular application.

While the invention has been described in connection with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:
1. A planetary transmission comprising:
  (a) a transmission housing;
  (b) a sun gear mounted in said housing;
  (c) a ring gear mounted in said housing;
  (d) a planetary carrier mounted in said housing;
  (e) at least one planetary gear rotatably mounted to said planetary carrier and engaged with said sun gear and said ring gear;
  (f) a brake for selectively braking one of said sun gear, said ring gear and said planetary carrier against rotation relative to said transmission housing;
  (g) a clutch for selectively clutching together two of said sun gear, said ring gear and said planetary carrier to prevent relative motion therebetween;
  (h) piston means for selectively activating either one of said brake and said clutch, but not both simultaneously, said piston means comprising:
    (i) activating means movable between a braking position activating said brake and a clutching position activating said clutch, said activating means including an annular plate;
    (ii) spring means for biasing said activating means toward one of said braking and said clutching positions; and
    (iii) a piston for moving said activating means to the other one of said braking and said clutching positions; and
  (i) a component extension connected to one of said sun gear, said ring gear and said planetary carrier, said component extension being engagable with said clutch and said brake and having an annular slot formed therein in which said annular plate is at least partially received.

2. The planetary transmission of claim 1, wherein said component extension has brake and clutch engagement surfaces formed thereon on opposite sides of said annular plate for engaging the rake and clutch, respectively, said brake being positioned between said brake engagement surface and said annular plate and said clutch being positioned between said clutch engagement surface and said annular plate.

3. The planetary transmission of claim 1, wherein said component extension has a cavity formed therein extending from one side wall of said annular slot, said cavity and said piston defining a hydraulic chamber therebetween.

4. The transmission of claim 3, wherein said spring means comprises a spring compressed between said annular plate and said component extension on the side thereof opposite to said piston.

5. The transmission of claim 4, wherein said spring means comprises an annular Belleville spring circumferentially surrounding said component extension.

6. A planetary transmission comprising:
  (a) a transmission housing;
  (b) a first drive shaft rotatably mounted within said transmission housing;
  (c) a second drive shaft rotatably mounted within said transmission housing;
  (d) a sun gear rotatably mounted within said housing;
  (e) a ring gear rotatably mounted to said second drive shaft for rotation therewith;
  (f) a planetary carrier mounted to said first drive shaft for rotation therewith;
  (g) a plurality of planetary gears rotatably mounted to said planetary carrier and engaged with said sun gear and said ring gear;
  (h) a sun gear extension rotatably mounted in said transmission housing coaxial with said sun gear and connected with said sun gear for rotation therewith, said sun gear extension having an annular slot formed therein, an annular cavity formed in a first side wall of said annular slot, a first engagement surface formed on said first wall of said annular slot and a second engagement surface formed on a second side wall of said annular slot;
  (i) an annular plate slidably mounted in said annular slot to be movable towards either wall of said annular slot;
  (j) spring means for biasing said annular plate towards said first side wall of said annular slot;
  (k) an annular piston slidably mounted in said annular cavity and engagable with said annular plate to press said annular plate towards said second side wall of said annular slot, said annular piston and said annular cavity defining a hydraulic chamber therebetween;
  (l) control means for supplying pressurized hydraulic fluid to said hydraulic chamber to move said annular piston towards said second side wall of said annular slot and for draining hydraulic fluid from said hydraulic chamber to allow said spring means to move said annular piston towards said first side wall of said annular slot;
  (m) a brake pad fixed to said transmission housing and extending between said annular plate and one of said engagement surfaces; and
  (n) a clutch pad mounted to said planetary carrier for rotation therewith and extending between said annular plate and the other one of said engagement surfaces.

7. The transmission of claim 6, further comprising first stop means for preventing relative rotation between said annular piston and said annular plate.

8. The transmission of claim 7, wherein said annular piston has at least one projection formed thereon and said annular plate has at least one corresponding opening formed therein into which said at least one projection can extend, said projection and corresponding opening together comprising said first stop means.

9. The transmission of claim 7, further comprising second stop means for preventing relative rotation between said sun gear extension and said annular plate.

10. The transmission of claim 9, wherein said annular ring has at least one opening extending therethrough and said sun gear extension is provided with at least one shaft extending through said at least one opening, said opening and shaft together comprising said second stop means.

11. The transmission of claim 6, wherein said sun gear extension is provided with a shoulder adjacent said annular ring and said spring means comprises a Belleville spring compressed between said shoulder and said annular ring.

12. The transmission of claim 6, wherein each said planetary gear comprises first and second gears fixed for rotation together, with the first gear engaging said sun gear and the second gear engaging said ring gear.

* * * * *